US008560449B1

(12) United States Patent
Sears

(10) Patent No.: US 8,560,449 B1
(45) Date of Patent: Oct. 15, 2013

(54) ADAPTIVE TRANSACTION RULES SYSTEM

(75) Inventor: Robert Kern Sears, Palo Alto, CA (US)

(73) Assignee: Red Giant Inc., Palo Alto, CA (US)

( * ) Notice: Subject to any disclaimer, the term of this patent is extended or adjusted under 35 U.S.C. 154(b) by 119 days.

(21) Appl. No.: 12/847,549

(22) Filed: Jul. 30, 2010

Related U.S. Application Data

(60) Provisional application No. 61/273,089, filed on Jul. 30, 2009, provisional application No. 61/273,891, filed on Aug. 10, 2009.

(51) Int. Cl.
*G06Q 40/00* (2012.01)
(52) U.S. Cl.
USPC .......................................................... 705/42
(58) Field of Classification Search
USPC .................................................... 705/35–45
See application file for complete search history.

(56) References Cited

U.S. PATENT DOCUMENTS

| 7,290,704 | B1 * | 11/2007 | Ball et al. ........................ 235/380 |
|---|---|---|---|
| 7,401,731 | B1 * | 7/2008 | Pletz et al. ..................... 235/380 |
| 7,413,113 | B1 | 8/2008 | Zhu |
| 7,487,170 | B2 * | 2/2009 | Stevens ......................... 707/101 |
| 7,584,152 | B2 * | 9/2009 | Gupta et al. .................... 705/65 |
| 7,831,521 | B1 * | 11/2010 | Ball et al. ........................ 705/64 |
| 8,103,545 | B2 | 1/2012 | Ramer et al. |
| 8,140,389 | B2 | 3/2012 | Altberg et al. |
| 8,336,770 | B2 * | 12/2012 | Grillion ........................ 235/380 |
| 2002/0123938 | A1 * | 9/2002 | Yu et al. ........................... 705/26 |
| 2005/0199714 | A1 * | 9/2005 | Brandt et al. ............. 235/382.5 |
| 2007/0100773 | A1 * | 5/2007 | Wallach ........................... 705/75 |
| 2008/0021787 | A1 * | 1/2008 | Mackouse ...................... 705/17 |
| 2008/0033880 | A1 * | 2/2008 | Fiebiger et al. ................. 705/44 |
| 2008/0099552 | A1 * | 5/2008 | Grillion ........................ 235/380 |
| 2008/0177663 | A1 | 7/2008 | Gupta et al. |
| 2008/0306790 | A1 * | 12/2008 | Otto et al. ......................... 705/7 |
| 2009/0063312 | A1 * | 3/2009 | Hurst ............................... 705/30 |
| 2009/0171683 | A1 * | 7/2009 | Hoyos et al. ...................... 705/1 |
| 2009/0192904 | A1 * | 7/2009 | Patterson et al. ............... 705/17 |
| 2009/0198614 | A1 * | 8/2009 | De Ruiter et al. .............. 705/41 |
| 2010/0063903 | A1 * | 3/2010 | Whipple et al. ............... 705/30 |
| 2010/0228669 | A1 * | 9/2010 | Karim ............................ 705/42 |

OTHER PUBLICATIONS

"Alaric: Euronet Worldwide to implement Alarics Fractals fraud detection solution; Fractals will provide a comprehensive fraud solution for the prevention and detection of fraudulent transactions", M2 Presswire [Coventry], Nov. 7, 2006, pp. 1-2.*
Related U.S. Appl. No. 12/771,815, filed Apr. 30, 2010.
Related U.S. Appl. No. 12/853,152, filed Aug. 9, 2010.

* cited by examiner

*Primary Examiner* — Mohammad Z Shaikh
(74) *Attorney, Agent, or Firm* — Dorsey & Whitney LLP

(57) ABSTRACT

Systems, methods, and computer readable media having computer executable instructions for modifying behavior of a set of rules used to govern the operation of a payment transaction system are disclosed. An example system includes a transaction processing entity, rules processing entity, and a user interaction processing entity. A transaction request from a requesting entity is received by the transaction processing entity and the rules processing entity applies a rules set with related parameters of operation to the transaction. A response is generated based at least in part on the rule set and returned to the transaction processing entity. The user interaction processing entity is configured to interact with a user associated with a payment account and present information about a transaction. The user interaction processing entity is further configured to receive from the user direction regarding how to modify the rule set and related parameters associated with the payment account.

15 Claims, 2 Drawing Sheets

ADAPTIVE TRANSACTION RULES SYSTEM

CROSS-REFERENCE TO RELATED APPLICATIONS

This application claims priority to U.S. Provisional Application No. 61/273,089, filed Jul. 30, 2009, and U.S. Provisional Application No. 61/273,891, filed Aug. 10, 2009. The entire disclosure of the prior applications is considered to be part of the disclosure of the instant application and is hereby incorporated by reference therein.

TECHNICAL FIELD OF THE INVENTION

Embodiments of the invention relate generally to payment systems, and more particularly, to payment systems having rules controlling access to funds (i.e.—authorization), application of funding sources and alerts or feedback for a transaction, which rules are in some degree configurable by individuals associated with the account, such as the accountholder, the holder of a payment card or other payment token associated with the account or a third party designated by the accountholder.

BACKGROUND OF THE INVENTION

Current payment card systems provide little to no control mechanisms for the cardholder or accountholder to use to regulate and monitor usage of the card. While the use of electronic payment systems has grown dramatically over the years since credit cards were introduced, the sophistication of the user experience offered has not.

Presently, card transactions are for the most part authorized or declined by using a set of authorization rules that are primarily under the control of the issuing bank or its delegate, the transaction processor. Other entities may participate in this authorization chain, such as a card alliance (e.g. —Visa, Master Card) for network-branded cards, but only by way of agreements with the issuing bank. The fundamental parameters used to authorize or decline a transaction are effectively opaque (and rigid) to the cardholder or accountholder. While the cardholder or accountholder is expected to pay his or her bill and carefully control spending so as not to go over his or her credit limit, there is no mechanism that the cardholder can use to actively set limits on card usage. It is all a manual effort on the part of the cardholder or accountholder.

Further, a cardholder or accountholder cannot help enforce legitimate usage of his or her card—cardholders/accountholders are completely reliant on the card issuer's and alliance's fraud detection mechanisms, coupled with—again—manual effort on the cardholder's/accountholder's part.

DETAILED DESCRIPTION

Embodiments of the invention allow adaptation of rules and rule configurations for payment transaction systems based on circumstances of and responses from a payment cardholder or accountholder. For example, in some embodiments, people are provided with the ability to set the rules controlling use of the payment system in a natural and interactive way. Embodiments of the invention may allow users to alter the behavior of the payment system to react to, for example, what they are doing, where they are, what they are attempting to do at the moment, what they will do in the future, or what they have done in the past. The payment system may be a card-based system (using tokens such as physical mag-stripe cards or virtual cards), a person-to-person payment system, a person-to-business payment system, or the like.

In some embodiments of the invention, transactions are authorized or declined based on application of a set of rules to the transaction (and possibly transaction context, including user context) at hand; and rules may be adapted—changed, added, configured, deleted, etc. —based on interactions with the cardholder or accountholder (or other relevant individual).

Example systems and methods for payment transactions are described in U.S. patent application Ser. No. 12/771,815, entitled "CONTROLLABLE PAYMENT SYSTEM" and filed Apr. 30, 2010, the entire disclosure of which is considered to be part of the disclosure of the instant application and is hereby incorporated herein by reference in its entirety for any purpose.

Figure 1:
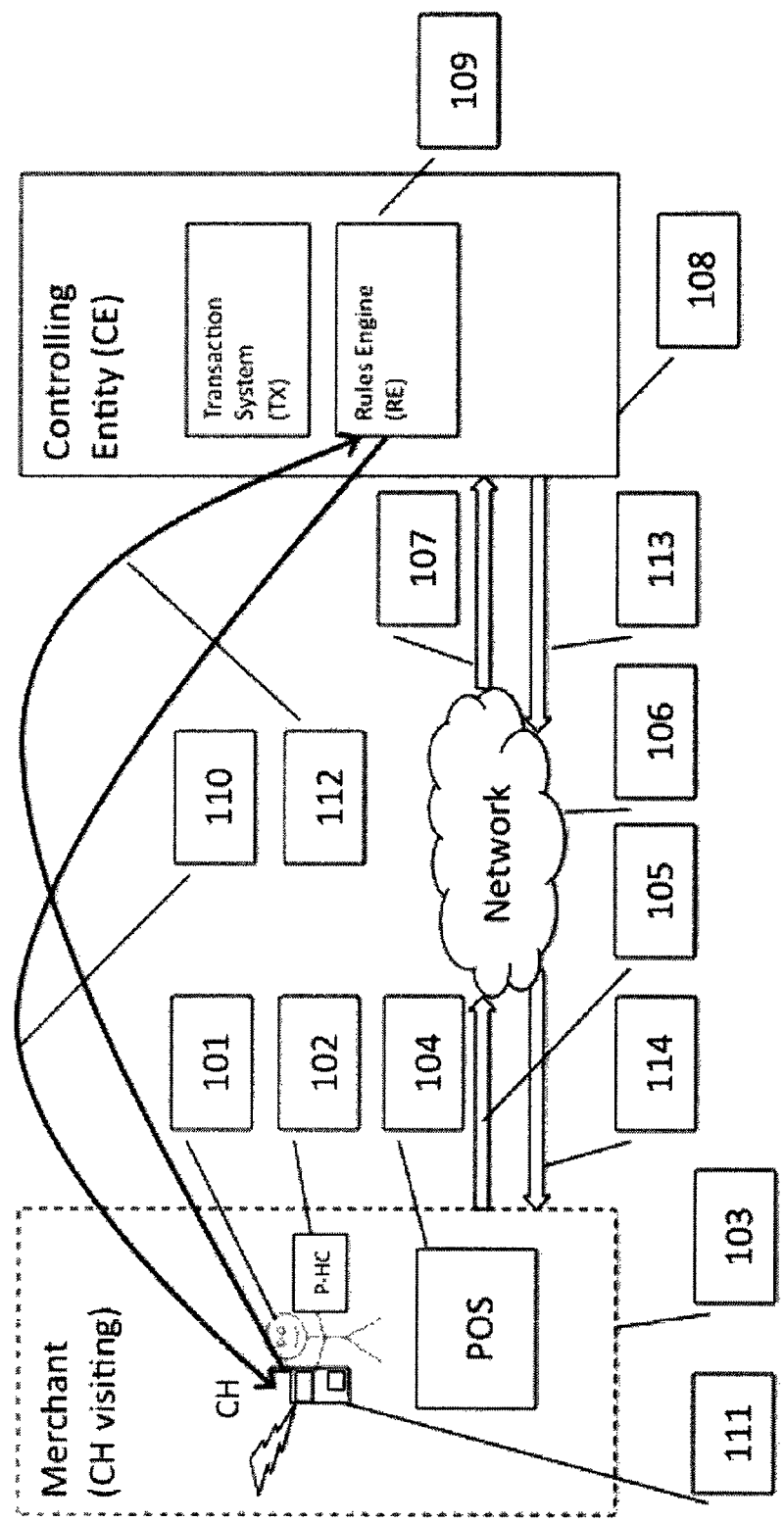
FIG. 1 is a block diagram of an adaptive transaction rule system in operation according to an embodiment of the invention.

An example embodiment is illustrated in FIG. 1. In this example, a cardholder ("CH," item 101 in FIG. 1) brings a payment card (102), which may be either a physical card or virtual card, to a merchant (103). The merchant may be either a physical merchant or on-line. The merchant's point of sale system (104, either a physical POS like a cash register, or an on-line payment gateway) is used to initiate a transaction. Communication (105) from the merchant flows through relevant entities such as a merchant processor and card association network—together termed "Network" (106) here. Communication (107) further proceeds to the Controlling Entity ("CE," 108), which will eventually return a response for the merchant. This communication 105 & 107 may be a transaction authorization request, a pre-approval request, an actual transaction request, or the like. The CE 108 includes for purposes of discussion a system that handles transactions ("TX") as well as a Rules Engine ("RE", 109).

In this example, communication 107 (e.g., an incoming request) causes the RE 109 to seek further information from the CH 101. This further information may be an authorization to proceed with the transaction, a designation of a funding source, acceptance or denial of future similar transactions, etc. In this example, the request is made via mobile device. In alternative embodiments, the request may be made by alternative communication mechanisms. The outgoing request for information (110) arrives, in this case, on the CH's mobile device (111). The CH 101 then provides input and the response (112) is sent back to the CE 108 (typically ultimately to the RE 109 within the CE).

In this example, the CE 108 returns a response to the merchant 103 beginning with item 113, flowing back through the Network 106 and finally presented to the merchant 103 as item 114.

Figure 2:
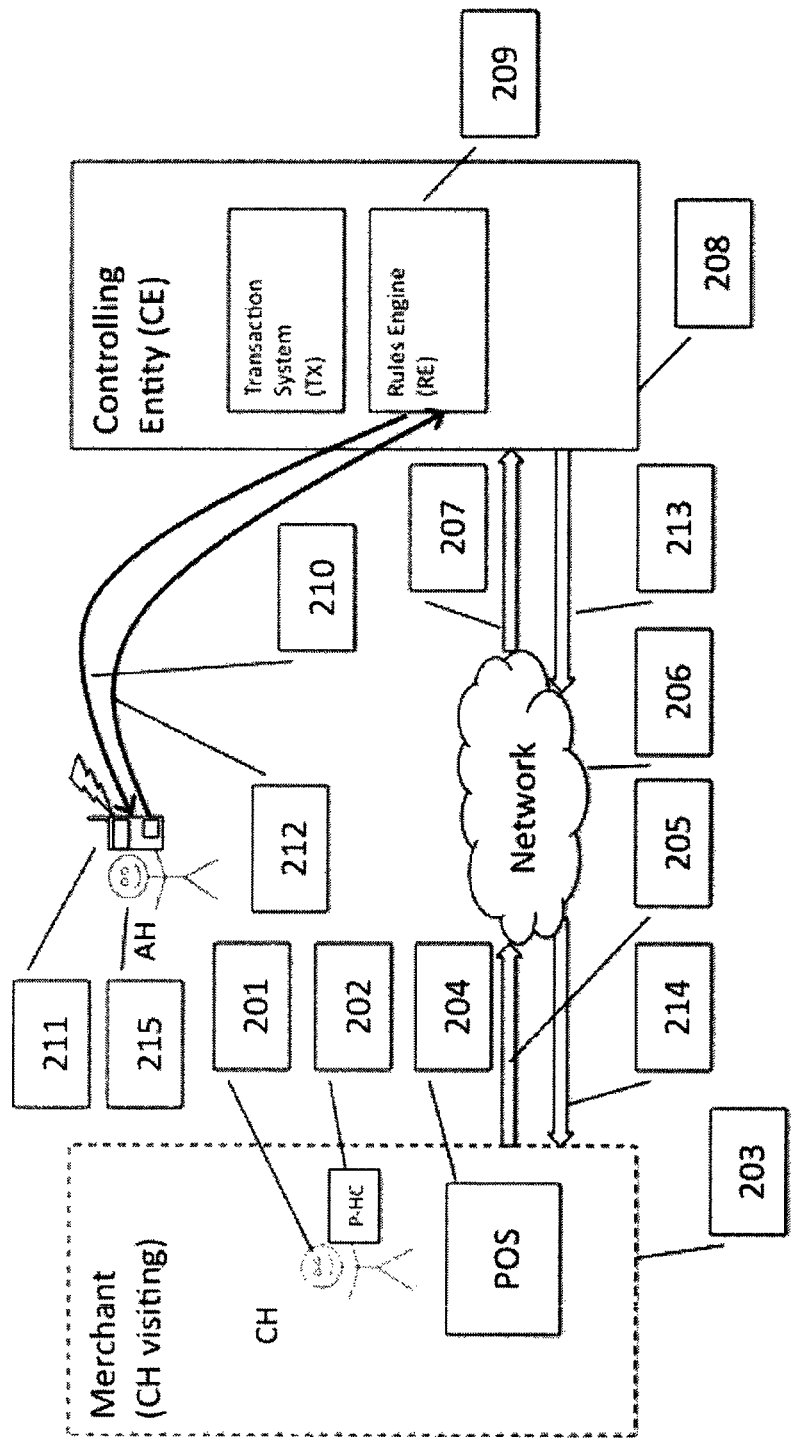
FIG. 2 is a block diagram of an adaptive transaction rule system obtaining direction from an individual associated with the payment account, that individual being separate from the cardholder attempting the transaction.

The RE 109 is employed by the CE 108 to make judgments on requested transactions. Rule sets (which may include one or more rules) are used in the RE 109 and the parameters for application of those rules may be altered according to the input from and context of an individual pertinent to the transaction, for example, the CH 101 or perhaps the accountholder ("AH", item 215 in FIG. 2).

Consider the following example interactions.

Example 1

A CH 101 has configured a card rule set (including rule "RS1") so that every first-time transaction at a new merchant 103—one at which the card 102 has never previously been used for transactions—must be approved by the CH 101 via mobile phone. In this scenario, the CH 101 proceeds to the merchant 103 and begins a transaction with a typical card swipe. The CE 108 sees the incoming transaction authorization request and the RE 109 notes that this is a request from a merchant 103 at which this card 102 has never been used. Following the rule RS1, the RE 109 requests from the CH 101 verification that this merchant 103 is acceptable (via request for information 110 and response 112 of FIG. 1). If the CH 101 responds that the merchant 103 is acceptable, the RE 109 adds this merchant 103 to the known-merchants list for this card 102, thus changing the parameters of operation of RS1 for this CH 101.

Example 2

A CH 101 has configured a virtual card 102 so that it will be usable only at one particular on-line merchant 103, and has declared that the first transaction on the card 102, to be no more than 1 hour from the current time, will come from the merchant 103 (rule "RS2"). The CH 101 then begins a transaction with the merchant 103. The RE 109 notes this transaction request and communicates with the CH 101 in order to verify that this is, indeed the merchant 103 to which the card 102 should be locked. Utilizing the CH's response, the RE 109 updates the parameters of operation of RS2 so that the card 102 is usable in the future only at this merchant 103. Alternatively, the RE 109 may delete RS2 altogether and create a new rule RS3, which specifies that the card 102 is locked to the relevant merchant 103.

Example 3

An AH 215 (FIG. 2) has created a card 202 for use by the AH's child at college; the child will be the CH 201. The rules set includes a rule RS4, which alerts the AH 215 to any purchases made outside the geographical boundaries of the college campus. At one point in time, CH 201 makes a purchase at a grocery store 203 outside campus; AH 215 is notified (shown by communication 210 in FIG. 2). Part of the notification is a request—asking AH 215 if future purchases at this retailer 203 should be, for example, always allowed, allowed only when pre-approved by AH 215 or always denied. AH 215 replies with "always allow," at which point RE 209 alters the parameters of operation of RS4 (or deletes RS4 and inserts a new rule RS5) in order to allow purchases at this grocery store 203 in the future, without further alerts being delivered to AH 215.

Mobile Interactions

Mobile interactions may be an effective mechanism for obtaining CH and/or AH input for rule set adaptation. While user input may be sought by the system via means such as email or IM, contacting the user via mobile device may add a facet of immediacy and may allow the system to incorporate information related to the user's context.

What is claimed is:

1. A method of modifying a set of rules of a payment transaction system, the method comprising:
   in response to a transaction initiated with a payment card of a user, electronically receiving from a point of sale terminal a transaction request or an authorization request associated with the transaction;
   responsive to the transaction request or authorization request, electronically transmitting to a first electronic device associated with the user a request for input from the user;
   using a second computing device associated with an entity different from the user, receiving the input from the user, wherein the second computing device is programmed to apply a set of rules associated with the payment card of the user;
   applying the set of rules to the transaction request or authorization request;
   responsive to the received input from the user, automatically modifying, using the second computing device, the set of rules based on the received input from the user for application of the modified set of rules to a future transaction, a future transaction request, or a future authorization request associated with the user;
   applying the modified set of rules to the future transaction, the future transaction request or the future authorization request associated with the user; and
   modifying one or more rules from the set of rules based on additional input provided by the user prior to the transaction.

2. The method of claim 1, wherein said modifying includes changing one or more parameters used by the set of rules.

3. The method of claim 1, wherein said modifying includes changing one or more rules: from the set of rules, adding an additional rule to the set of rules, or deleted one or more of the rules from the set of rules.

4. The method of claim 1, further comprising applying the modified set of rules to the transaction, the transaction request, or the authorization request.

5. The method of claim 1, wherein said electronically transmitting a request for input includes transmitting information to a mobile device of the user.

6. The method of claim 1, wherein the input from the user includes information about the user's context, including location, movement, environment or other contextual information.

7. The method of claim 1, further comprising setting a time limit or a geographic region within which the transaction, the transaction request, or the authorization request will cause a modification to one or more of the set of rules to occur, and outside of which the transaction, the transaction request or the authorization request will not cause the modification to occur.

8. A transaction system with adaptive rules, the system comprising:
   a computing device programmed to receive from a point of sale terminal, a transaction request or an authorization request in response to a transaction initiated with a payment card of a user, the computing device being further programmed to send to the user, responsive to the transaction request or the authorization request, a request for input from the user, and the computing device being further programmed to receive the input from the user; and
   a database comprising a set of rules associated with the payment card of the user, the computing device being in communication with the database, the computing device being further programmed to automatically modify the set of rules bases on the input from the user received response to the transaction request or the authorization request, the computing device further programmed to apply the modified set of rules to a future transaction, a future transaction request, or a future authorization request associated with the user, and the computing device further programmed to modify one or more rules from the set of rules based on additional input provided by the user prior to the transaction.

9. The system of claim 8 wherein the computing device is programmed to send the request for input wirelessly to a mobile device of the user and receive the input wirelessly from the user.

10. A non-transitory computer readable medium encoded with computer executable instructions comprising instructions for:
   receiving a transaction request or authorization request from a point of sale terminal in response to a transaction initiated by a payment card of a user;
   in response to said receiving the transaction request or the authorization request, accessing a set of rules associated with the payment card;
   in responsive to said receiving the transaction request or the authorization request, requesting input from the user;
   receiving the input from the user and automatically modifying the set of rules based on the received input;
   applying the modified set of rules to a future transaction, a future authorization request, or a future transaction request associated with the user; and
   modifying one or more rules from the set of rules based on additional input provided by the user prior to the transaction.

11. The non-transitory computer readable medium encoded with computer executable instructions of claim 10, further comprising computer executable instructions for receiving information describing a context of the user, wherein the user is an account holder of an account associated with the payment card or a card holder of the account associated with the payment card.

12. The method of claim 1, wherein the user is an account holder of an account associated with the payment card or a card holder of the account associated with the payment card.

13. The method of claim 1, wherein said electronically transmitting a request for input from the user includes transmitting the request to a third party designated by the user instead of the user, the third party being an agent of the user or a non-financial entity authorized by the user to hold authority over the account of the user.

14. The system of claim 8, wherein the user is an account holder of an account associated with the payment card or a card holder of the account associated with the payment card.

15. The system of claim 8, wherein the computing device is further programmed to send, responsive to the transaction request or the authorization request, a request for input to a third party designated by the user, wherein said third party is agent of the user or a non-financial entity authorized by the user to hold authority over the account of the user.

* * * * *